US007770860B1

(12) United States Patent  
Culpepper et al.

(10) Patent No.: US 7,770,860 B1
(45) Date of Patent: Aug. 10, 2010

(54) MEDICAL SERVICE SYSTEM ON ARTICULATING ARM WITH ELECTROMAGNETIC BRAKES

(75) Inventors: Taylor C. Culpepper, Oklahoma City, OK (US); Travis W. Webb, Tuttle, OK (US)

(73) Assignee: Modular Services Company, Oklahoma City, OK (US)

( * ) Notice: Subject to any disclaimer, the term of this patent is extended or adjusted under 35 U.S.C. 154(b) by 639 days.

(21) Appl. No.: 11/534,398

(22) Filed: Sep. 22, 2006

Related U.S. Application Data

(60) Provisional application No. 60/597,103, filed on Nov. 10, 2005.

(51) Int. Cl.
*A47H 1/10* (2006.01)
(52) U.S. Cl. ..................................... 248/324
(58) Field of Classification Search ............... 70/276; 188/161; 248/276.1, 323, 324, 317, 338
See application file for complete search history.

(56) References Cited

U.S. PATENT DOCUMENTS

| 3,431,937 | A | | 3/1969 | Hettlinger et al. |
| 3,931,452 | A | | 1/1976 | Nilsson |
| 4,073,456 | A | | 2/1978 | Karapita et al. |
| 4,515,333 | A | | 5/1985 | Pugh et al. |
| 4,517,632 | A | | 5/1985 | Roos |
| 4,523,732 | A | * | 6/1985 | Biber et al. ............ 248/123.11 |
| 4,548,373 | A | | 10/1985 | Komura |
| 4,572,594 | A | | 2/1986 | Schwartz |
| 4,577,055 | A | | 3/1986 | Wuertz |
| 4,601,449 | A | | 7/1986 | Sharbaugh |
| 4,689,513 | A | | 8/1987 | Dodt |
| 4,700,017 | A | | 10/1987 | Morand |

(Continued)

FOREIGN PATENT DOCUMENTS

CA          2392270          9/2003

(Continued)

OTHER PUBLICATIONS

Hill-Rom Services Inc., "The Hill-Rom Latitude Arm System," commercial literature dated Jul. 11, 2005 (Hill-Rom Services, Inc., Wilmington, DE, USA).

(Continued)

*Primary Examiner*—J. Allen Shriver, II
*Assistant Examiner*—Bradley H Duckworth
(74) *Attorney, Agent, or Firm*—Mary M. Lee

(57) ABSTRACT

A modular ceiling-mounted medical services system including a vertical column supported by an articulating arm assembly. Rotational joints connect the column to the lower arm, the lower arm to the upper arm, and the upper arm to the ceiling mount. Rotational movement at each of the joints is controlled by an electrically-released electromagnetic brake, and all of the brakes may be controlled by a switch panel on the column. Thus, the entire assembly is held in place until the switch is activated. Slight hand pressure is sufficient to operate the switch while simultaneously pushing or pulling the column into the desired position. The service lines that supply the outlets in the column all pass through large central openings in the brakes. In this way, the brake mechanism is stronger and more reliable, and the profile and footprint of the entire assembly can be minimized.

15 Claims, 16 Drawing Sheets

U.S. PATENT DOCUMENTS

| | | | |
|---|---|---|---|
| 4,793,203 | A | 12/1988 | Staggl et al. |
| 4,795,122 | A | 1/1989 | Petre |
| 4,901,967 | A | 2/1990 | Petre |
| 4,902,852 | A | 2/1990 | Wuertz |
| 5,040,765 | A | 8/1991 | Schonfelder |
| 5,072,906 | A | 12/1991 | Foster |
| 5,077,843 | A | 1/1992 | Dale et al. |
| 5,171,139 | A | 12/1992 | Underwood et al. |
| 5,184,601 | A | 2/1993 | Putman |
| 5,186,337 | A | 2/1993 | Foster et al. |
| 5,247,962 | A | 9/1993 | Walker |
| 5,275,364 | A | 1/1994 | Burger et al. |
| 5,284,255 | A | 2/1994 | Foster et al. |
| 5,377,371 | A | 1/1995 | Foster |
| 5,398,359 | A | 3/1995 | Foster |
| 5,400,995 | A | 3/1995 | Boyd |
| 5,412,272 | A | 5/1995 | Mensching |
| 5,448,859 | A | 9/1995 | Walker et al. |
| 5,455,975 | A | 10/1995 | Foster |
| 5,618,090 | A | 4/1997 | Montague et al. |
| 5,644,876 | A | 7/1997 | Walker |
| 5,647,491 | A | 7/1997 | Foster et al. |
| 5,743,503 | A | 4/1998 | Voeller et al. |
| 5,826,846 | A | 10/1998 | Buccieri et al. |
| 6,089,518 | A | 7/2000 | Nilsson |
| 6,095,468 | A * | 8/2000 | Chirico et al. .......... 248/282.1 |
| 6,096,025 | A | 8/2000 | Borders |
| 6,132,011 | A | 10/2000 | Iwamura et al. |
| 6,196,649 | B1 | 3/2001 | Block et al. |
| 6,213,481 | B1 | 4/2001 | Marchese et al. |
| D443,365 | S | 6/2001 | Walker |
| 6,256,935 | B1 | 7/2001 | Walker |
| 6,269,594 | B1 | 8/2001 | Walker |
| 6,321,883 | B1 * | 11/2001 | Pfann et al. ................. 188/161 |
| D452,573 | S | 12/2001 | Walker |
| 6,343,601 | B1 | 2/2002 | Kiske et al. |
| 6,434,329 | B1 | 8/2002 | Dube et al. |
| D472,325 | S | 3/2003 | Walker |
| 6,639,789 | B2 * | 10/2003 | Beger ......................... 606/46 |
| 6,668,493 | B1 | 12/2003 | Walker |
| 6,817,585 | B2 | 11/2004 | Wagner et al. |
| 6,830,421 | B1 | 12/2004 | Broderick |
| 6,997,425 | B2 | 2/2006 | Metelski |
| 7,040,057 | B2 | 5/2006 | Gallant et al. |
| 7,044,568 | B2 | 5/2006 | Olivera et al. |
| 7,065,811 | B2 | 6/2006 | Newkirk et al. |
| 7,065,812 | B2 | 6/2006 | Newkirk et al. |
| 7,073,765 | B2 | 7/2006 | Newkirk |
| 7,191,992 | B2 * | 3/2007 | Wagner et al. .............. 248/317 |
| 7,204,714 | B2 | 4/2007 | Walker et al. |
| 7,216,382 | B2 | 5/2007 | Newkirk et al. |
| 7,219,472 | B2 | 5/2007 | Gallant et al. |
| 7,219,864 | B2 * | 5/2007 | Strauss et al. ............ 248/122.1 |
| 7,227,081 | B2 | 6/2007 | Bally et al. |
| 7,254,850 | B2 | 8/2007 | Newkirk et al. |
| 7,425,679 | B2 | 9/2008 | Kasten et al. |
| 7,549,893 | B1 | 6/2009 | Walker et al. |
| 2003/0014817 | A1 | 1/2003 | Gallant et al. |
| 2003/0177713 | A1 | 9/2003 | Walker et al. |
| 2004/0164220 | A1 | 8/2004 | Newkirk |
| 2004/0231248 | A1 | 11/2004 | Walker et al. |
| 2004/0237202 | A1 | 12/2004 | Gallant et al. |
| 2004/0262484 | A1 | 12/2004 | Wagner et al. |
| 2005/0000019 | A1 | 1/2005 | Newkirk et al. |
| 2005/0083570 | A1 | 4/2005 | Ueda et al. |
| 2006/0207025 | A1 | 9/2006 | Newkirk et al. |
| 2006/0207026 | A1 | 9/2006 | Newkirk et al. |
| 2006/0226333 | A1 | 10/2006 | Newkirk |
| 2007/0068089 | A1 | 3/2007 | Gallant et al. |

FOREIGN PATENT DOCUMENTS

| | | |
|---|---|---|
| CA | 2467300 A1 | 11/2004 |
| DE | 92 04 321.6 U1 | 7/1992 |
| EP | 0508178 A1 | 10/1992 |
| FR | 1059860 | 3/1954 |
| JP | 61107698 A2 | 5/1986 |
| JP | 2001145292 A | 5/2001 |
| JP | 2000096873 A | 1/2010 |
| MX | PA/A/2004/004613 A | 8/2005 |
| MX | 262578 | 11/2008 |

OTHER PUBLICATIONS

Hill-Rom Services Inc., Price Book—Dual Telescoping 9000 Heads, Drawings #76, 77, 79, & 80/2006, dated 2006 (Hill-Rom Services, Inc., Wilmington, DE, USA).

Hill-Rom Services Inc., "Prima Xtend Tandem System," commercial literature dated 2002 (Hill-Rom Services, Inc., Batesville, IN, USA).

Hill-Rom Company Inc., "Latitude Arm System—Design and Application Manual," commercial literature dated 2005 (Hill-Rom Company, Inc. Batesville, IN, USA).

Hill-Rom Services Inc., "Latitude Arm System—Installation Instructions," commercial literature dated 2005 (Hill-Rom Services, Inc. Batesville, IN, USA).

Getinge USA, Inc., "Ceiling Pendant Systems for the ICU," commercial literature dated 2004 (Getinge USA, Inc., Rochester, NY USA).

Getinge USA, Inc., "Hanauport Alphaking Arm System—Data and Specifications," commercial literature undated by published prior to Sep. 22, 2006 (Getinge USA, Inc., Rochester, NY USA).

Getinge USA, Inc., "Hanauport Detachable SlimLine—Datasheet," commercial literature dated by published prior to Sep. 22, 2006 (Getinge USA, Inc., Rochester, NY USA).

Draeger Medical Inc. "Transport 400" undated commercial literature published prior to Sep. 22, 2006 (Draegar Medical Inc., Telford, PA, USA).

Modular Services Company, "Stratus Modular Medical Headwall System—Owners Manual and Installation Instructions," commercial literature, Jun. 1, 2005 (Modular Services Company, Oklahoma City, Ok, USA).

* cited by examiner

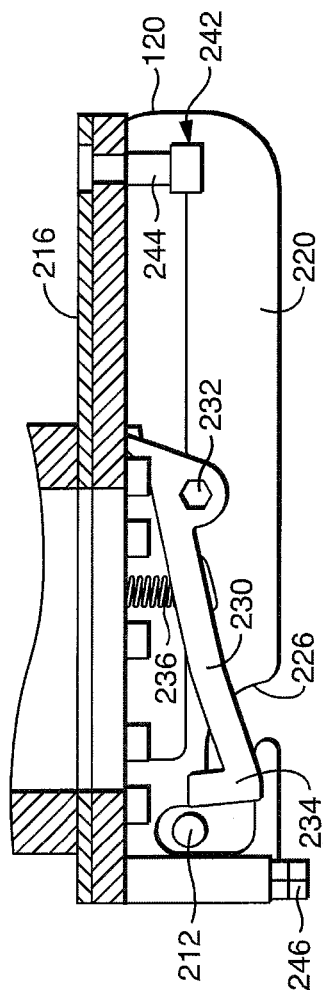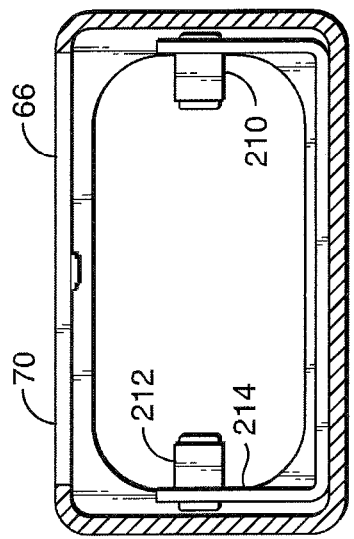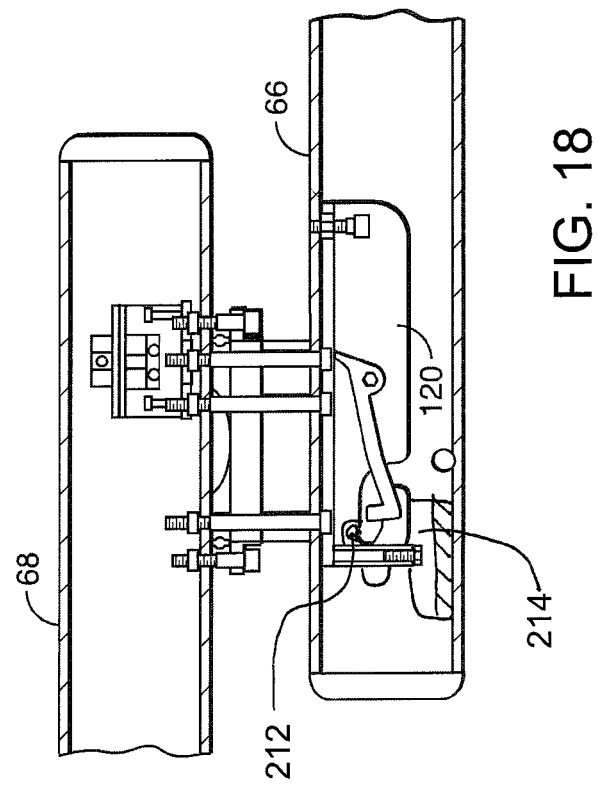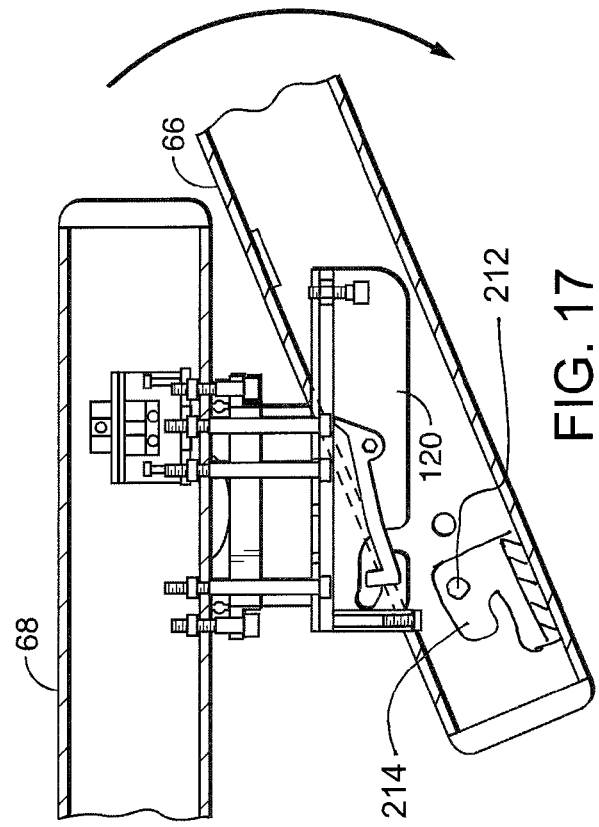

MEDICAL SERVICE SYSTEM ON ARTICULATING ARM WITH ELECTROMAGNETIC BRAKES

This application claims the benefit of the filing date of provisional application Ser. No. 60/597,103, entitled "Ceiling Mounted Medical Services Column," filed Nov. 10, 2005, the contents of which are incorporated herein by reference.

FIELD OF THE INVENTION

The present invention relates to devices for providing gas, vacuum, electrical, communication, data and other services to medical care facilities or other settings.

BRIEF DESCRIPTION OF THE DRAWINGS

FIG. 15 is an end view of the arm housing of the first arm.

FIG. 16 is a sectional view of the coupler of the first arm with the pin engaged in the slot.

FIGS. 17 and 18 illustrate use of the slide-in latch and lock assembly of the arm housings.

DETAILED DESCRIPTION OF THE PREFERRED EMBODIMENT

Ceiling-mounted medical service columns provide several advantages, especially in the surgical, emergency room and critical care settings. Articulating arm assemblies have greatly improved movability of these columns. However, there is an ongoing need to improve these systems to provide quieter, stronger and more reliable braking systems, to facilitate multi-dimensional leveling of the components during assembly and throughout the life of the system, to make installation simpler and safer using modular components, and to achieve these goals without increasing the weight or the footprint of the overall apparatus.

Figure 1:
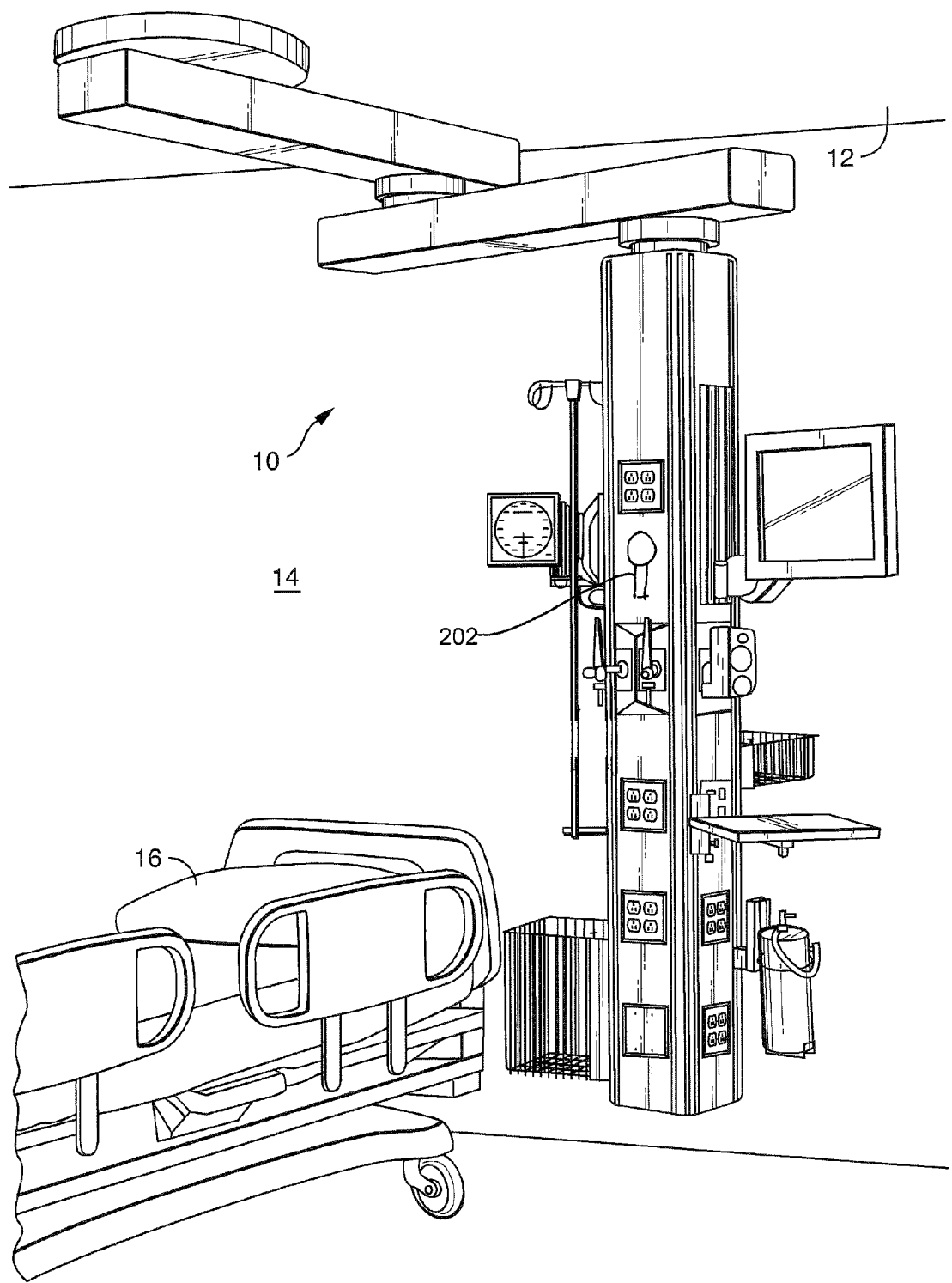
FIG. 1 is a perspective view of a ceiling-mounted medical service system constructed in accordance with a preferred embodiment of the present invention and shown in a hospital room.

Turning now to the drawings in general and to FIG. 1 in particular, there is shown therein a medical service system constructed in accordance with the present invention and designated generally by the reference numeral 10. As is apparent from FIG. 1, the system 10 is ideally suited to be supported on the ceiling 12 of a hospital room 14 and is depicted adjacent a hospital bed 16. However, the system 10 may be installed in any structure and in a variety of settings such as clinics, emergency rooms, operating rooms, nursing home rooms, and virtually any sort of medical treatment facility. In addition, though mounting to a ceiling or other horizontal surface is preferred, the system can be supported from other structures such as walls or other vertical support surfaces.

Figure 2:
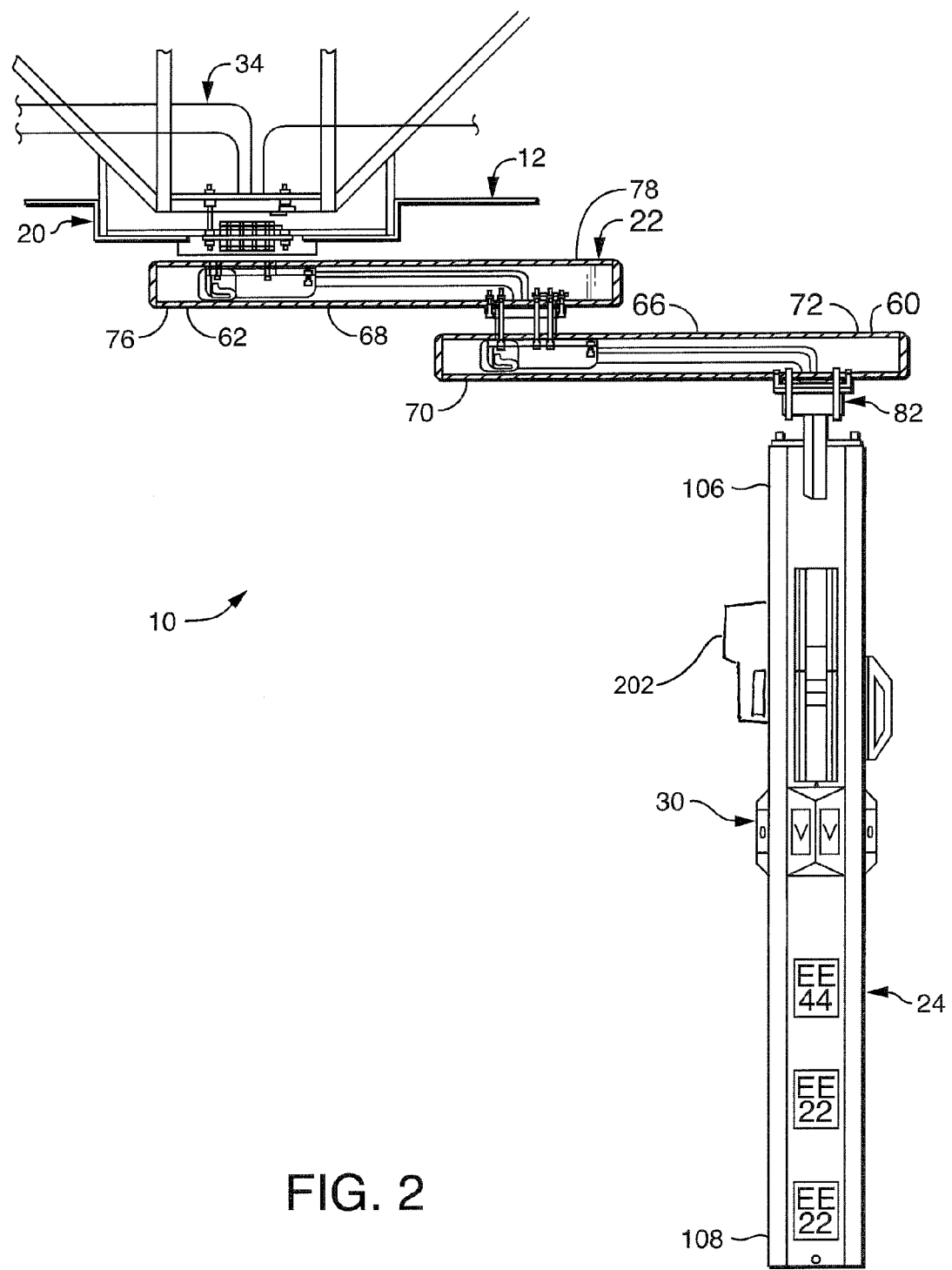
FIG. 2 is a schematic view of the system showing the path of the multiple service conduits entering the mounting assembly from above the ceiling and passing through the arm assembly into the column.

As seen in FIGS. 1-5, the system 10 may be provided in modular components for easy shipping and simplified installation. Preferably, these components comprise a mounting assembly 20, an arm assembly 22, and a medical service unit 24. Supported on the service unit 24 are at least one and usually several medical service outlets designated collectively at 30. Also included in the system 10, as seen in FIG. 2, are conduits designated generally at 34 including a conduit for supplying a service to each of the service outlets 30.

As used herein, "services" refers to all types of gases, liquids, vacuum, power and data lines, including but not limited to oxygen, compressed air, vacuum (suction), electricity, telephone, audio and video signals, and all forms of digital and analog data signals for computer networking and the like. Accordingly, each of the service outlets 30 is adapted to supply a particular service in a well known manner. In most instances, the outlets will include several different types of outlets, gas connections, telephone jacks, coaxial cable connections, electrical outlets, and others to make the different types of services all available from the service unit 24. Likewise the conduits 34 will be adapted to supply the different types of services and will include gas conduits, electrical wires, coaxial cables, telephone and data lines, and so forth.

It will now be apparent that, though the system 10 is particularly suited for a medical environment, it could be adapted easily to other settings that require supply of any or all such services. This might include other technical settings, such as laboratories and manufacturing facilities, or office settings, requiring repositionable connections to service lines.

Figure 3:
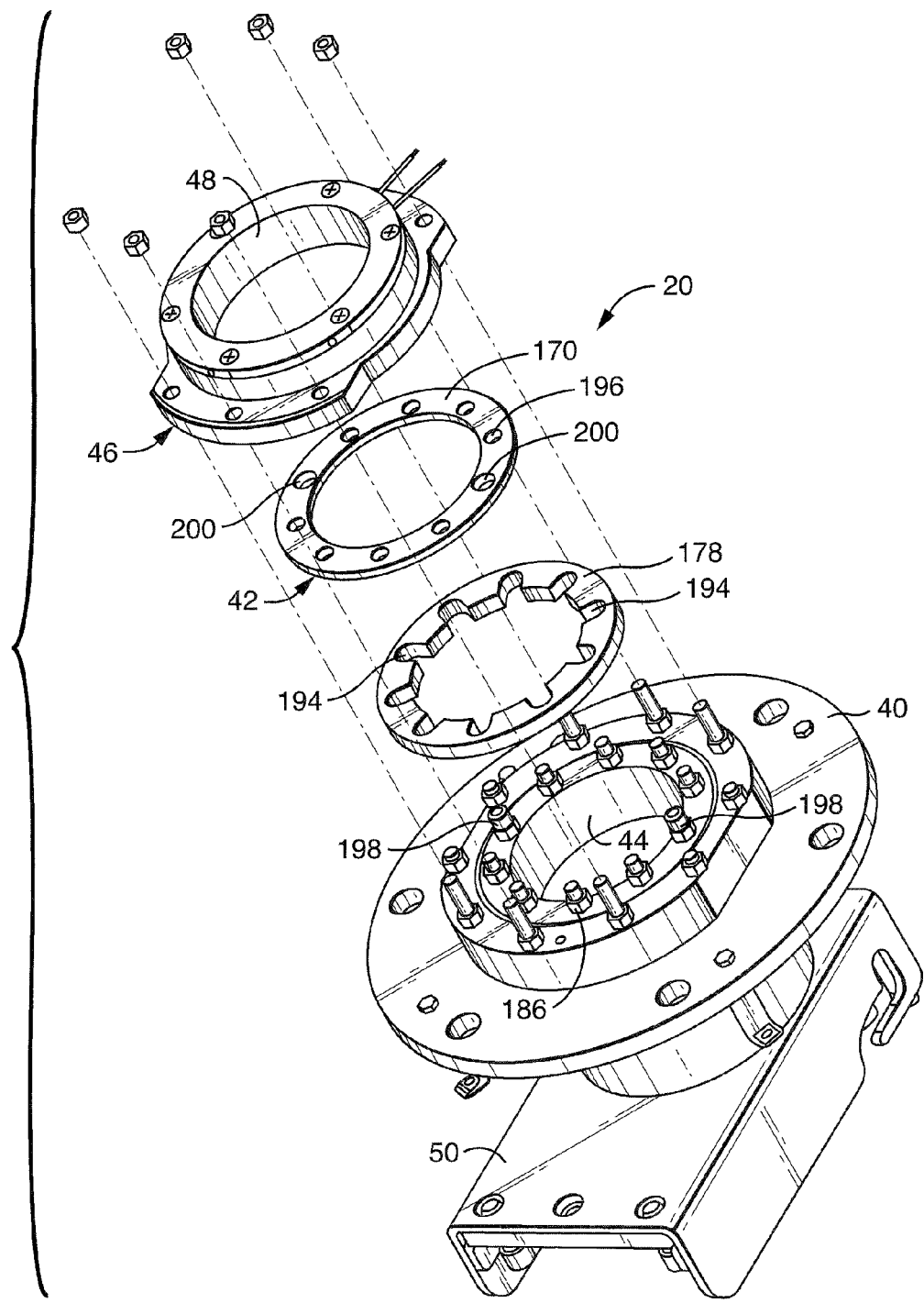
FIG. 3 is an exploded, perspective view of the mounting assembly.

With reference now to FIG. 3, a preferred mounting assembly 20 will be described. The mounting assembly 20 comprises a mounting member or structure, such as the mounting plate 40 by which the assembly 20 is connectable to the ceiling 12 or other structure. The plate 40 preferably is circular and flat, but may take other shapes as it will be adapted to conform to the supporting surface.

The mounting assembly 20 also includes a first rotor assembly 42 mounted for rotation relative to the mounting plate 40, which is fixed to the ceiling 12 (FIG. 1). The rotor assembly 42 may vary, it will usually be ring-shaped or annular and will include a central bore 44 therethrough.

Also included in the mounting assembly 20 is a first electromagnetic brake assembly 46, which is adapted to control rotation of the first rotor assembly 42. In a manner to be described in more detail hereafter, the brake assembly 46 is magnetically engageable with the first rotor assembly 42.

A first coupler 50 is supported on the rotor assembly 42 for rotation with it. As will become apparent, there are several similarly formed rotor assemblies, brake assemblies, and couplers in the system 10, and one of each these components will be described in more detail hereafter.

Figure 4:
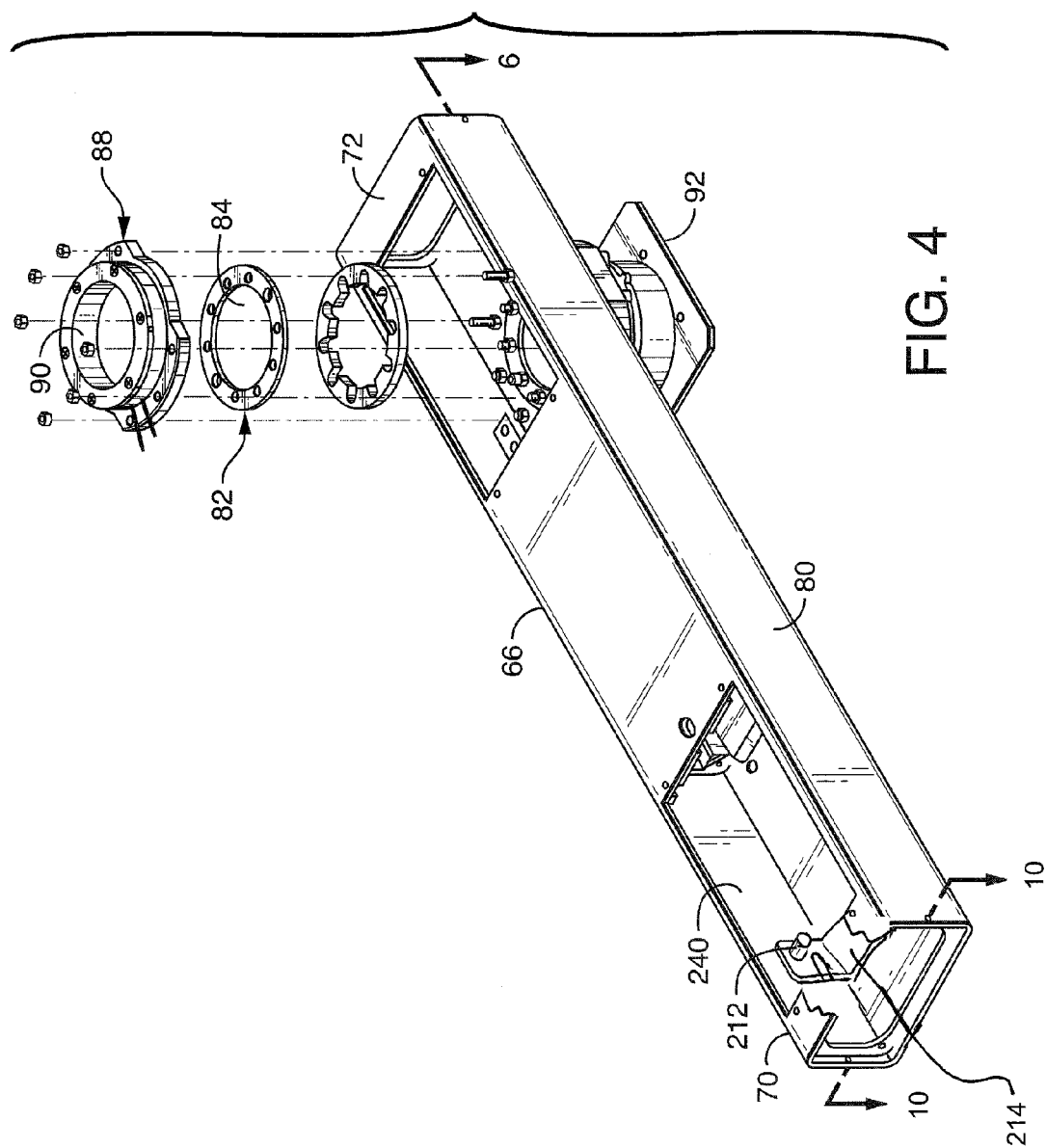
FIG. 4 is an exploded, perspective view of the first arm of the arm assembly.
Figure 5:
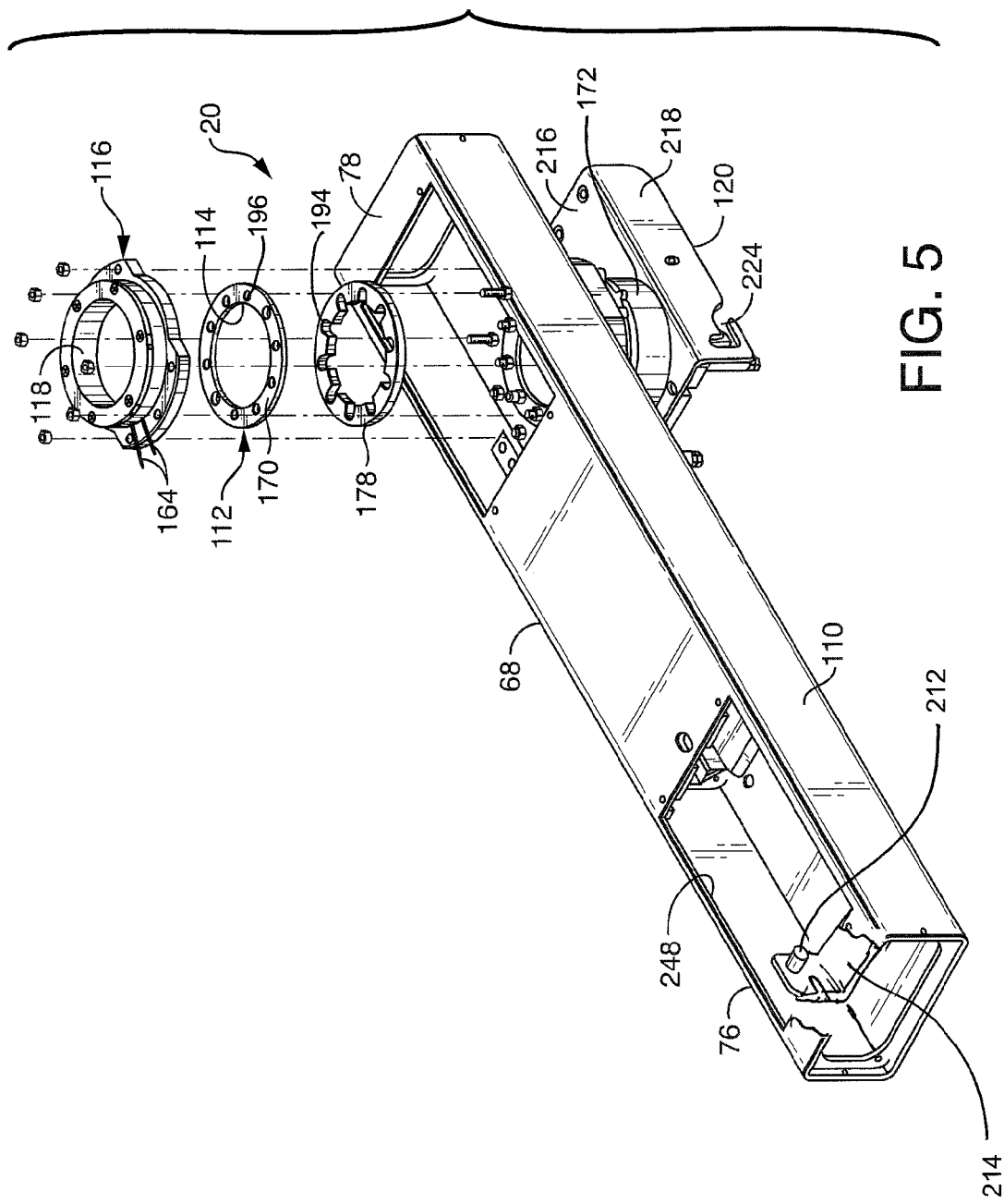
FIG. 5 is an exploded, perspective view of the second arm of the arm assembly.

Turning next to FIGS. 2, 4 and 5, the arm assembly 22 will be described. As best shown in FIG. 2, the arm assembly 22 has a distal end 60 and a proximal end 62. The proximal end 62 of the arm assembly 22 is engageable with the first coupler 50 of the first mounting assembly 20 in a manner yet to be described.

Most preferably, the arm assembly 22 includes a first arm 66 and a second arm 68, the first arm 66 having a proximal end 70 and a distal end 72, and the second arm 68 having a proximal end 76 and a distal end 78. Thus, the proximal end 76 of the second arm 68 forms the proximal end 62 of the arm assembly 22, and the distal end 72 of the first arm 66 forms the distal end 60 of the arm assembly.

The first arm 66 comprises an elongate, hollow housing 80 having a generally rectangular cross section. Mounted for rotation on the distal end 72 of the first arm 66 is a second rotor assembly 82. Like the other rotor assemblies, the rotor assembly 82 has a central bore 84 therethrough (FIG. 4) continuous with the inside of the housing 80. Also provided on the distal end 72 of the first arm 66 is a second brake assembly 88, which is adapted to control rotation of the second rotor assembly 82 by magnetic engagement with the rotor assembly 82. As second coupler 92 with an opening (not shown) is supported from the second rotor assembly 82.

Again referring to FIG. 2, in the preferred embodiment shown and described herein the service unit 24 is a long narrow vertically-oriented multi-sided column, although the shape and orientation of the unit can vary, and the arm assembly 22 is generally horizontal. Thus, the column 24 has a proximal end 106 and distal end 108.

In this embodiment, where the column 24 is suspended from the ceiling 12 (FIG. 1), the distal end 108 floats freely and the proximal end 106 is engageable with the distal end 60 of the arm assembly 22, that is, the distal end 72 of the first arm 66, and specifically the second coupler 92 thereof. Thus, the second coupler 92 (FIG. 4) may be formed as a small mounting plate that secures to the top of the column 24.

With continuing reference to FIGS. 2 and 5, the second arm 68 comprises an elongate, hollow housing 110 similar to the housing 80 of the first arm 66. The second arm 68 comprises a third rotor assembly 112 mounted for rotation on the distal end 78 of the second arm 68. Like the other rotor assemblies, the third rotor assembly 112 has a central bore 114 therethrough (FIG. 4). The second arm 68 comprises a third brake assembly 116, also having a central bore 118 therethrough. A third coupler 120, similar to the first coupler 50 on the mounting assembly 20, is fixed to the rotor assembly 112 for rotation therewith.

As illustrated in FIG. 2, the preferred system 10 provides a continuous path for the conduits 34. This path begins at the service sources elsewhere in the facility above the ceiling 12 (junction boxes, gas manifolds, etc.), or beyond whatever support surface that engages the mounting assembly 20. The path continues through the central bores 44 and 48 of the rotor and brake assemblies 42 and 46 in the mounting assembly 20, then through the second arm 68 and the central bores 114 and 118 of the rotor and brake assemblies 112 and 116 in the second arm. Finally, the path passes through the first arm 66 and the central bores 84 and 90 of the rotor and brake assemblies 82 and 88 in the in the first arm, and down into the column 24 to connect to the outlets 30. This configuration allows the profile and footprint of the arms and column to be minimized.

From the forgoing, it will be understood that each of the above-described sets of rotor and brake assemblies with the attached couplers forms a joint for rotatably connecting a first member, such as the mounting assembly, the first arm or the second arm, to a second member, such as the first arm, the second arm, or the column. This joint is exemplified by the distal end 78 of the second arm 68 shown in FIGS. 6 and 7.

Referring now to FIGS. 6-10, the preferred design for the brake assembly 116 will be described in more detail. The brake assembly 116 comprises a brake member, such as the permanent magnet 130. In this embodiment, the magnet is ring-shaped and captured between an inner brake housing 132, which defines the central bore 118, and an outer brake housing 134. These components are secured together with multiple screws 136 surrounding by bushings 138 through aligned openings (not separately numbered).

Figure 8:
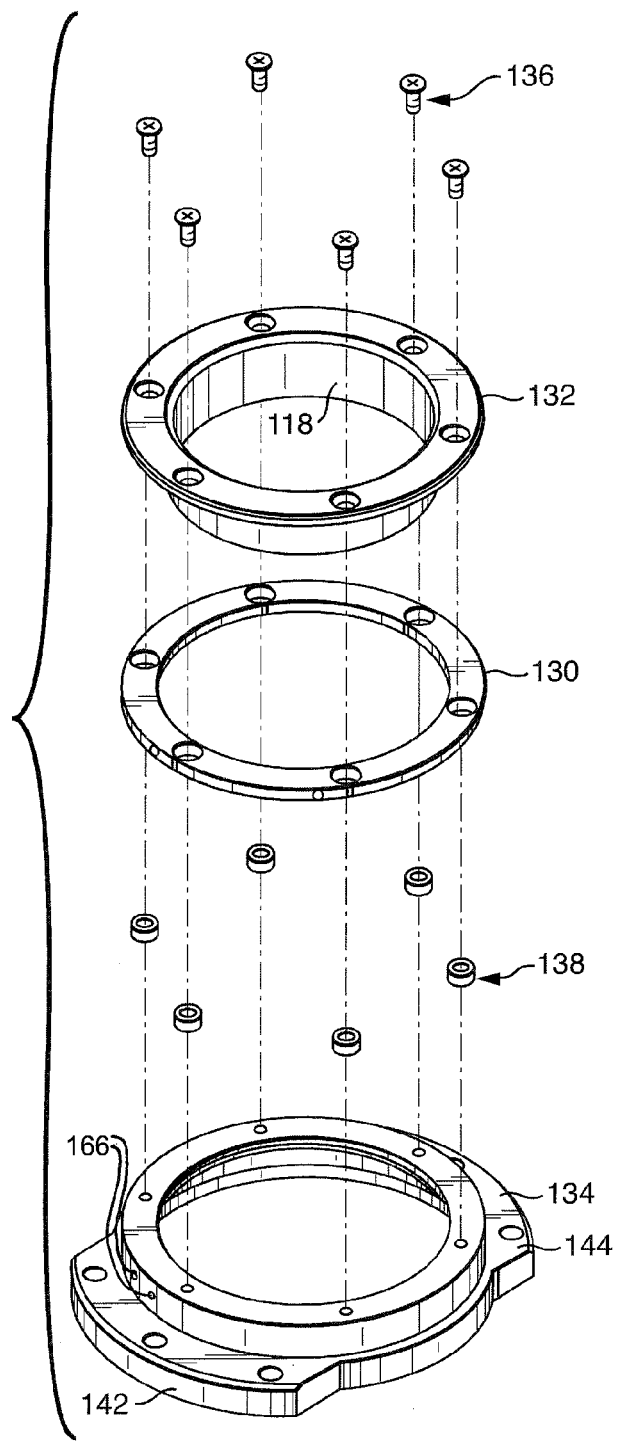
FIG. 8 is an exploded perspective view of the brake assembly.
Figure 8A:
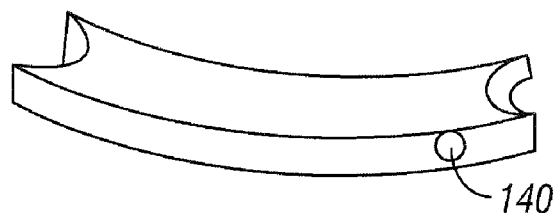

For ease of manufacture, the permanent magnet 130 may be formed of multiple sections that together form a ring, with abutting ends of adjacent sections forming the openings to receive the bushings 138, as best seen in FIG. 8. When the magnet 130 is comprised of such multiple segments, it is convenient to include a marking to indicate polarity and thus correct positioning of the magnets relative to each other and of the assembled magnet to the brake assembly. To that end, in the embodiment shown herein, each segment is provided with an indicator, such as a colored dot 140, in the same position. Thus, assembly of the magnet ring is guided by correct arrangement of the dots. While the dots 140 are visually perceptible, tactile indicators, such as bumps, ribs or grooves could be employed instead.

With continuing reference to FIGS. 6-10, the outer brake housing 134 has flanges 142 and 144 on opposite sides for receiving bolts 146 (FIGS. 6 & 7), which secure the brake assembly 116 to the floor of the housing 96. Captured between the heads of the bolts 146 and the floor of the housing 96 is a bearing collar 150 with an inner annular shelf 152 for supporting the outer race 154 of a bearing assembly 156.

Figure 6:
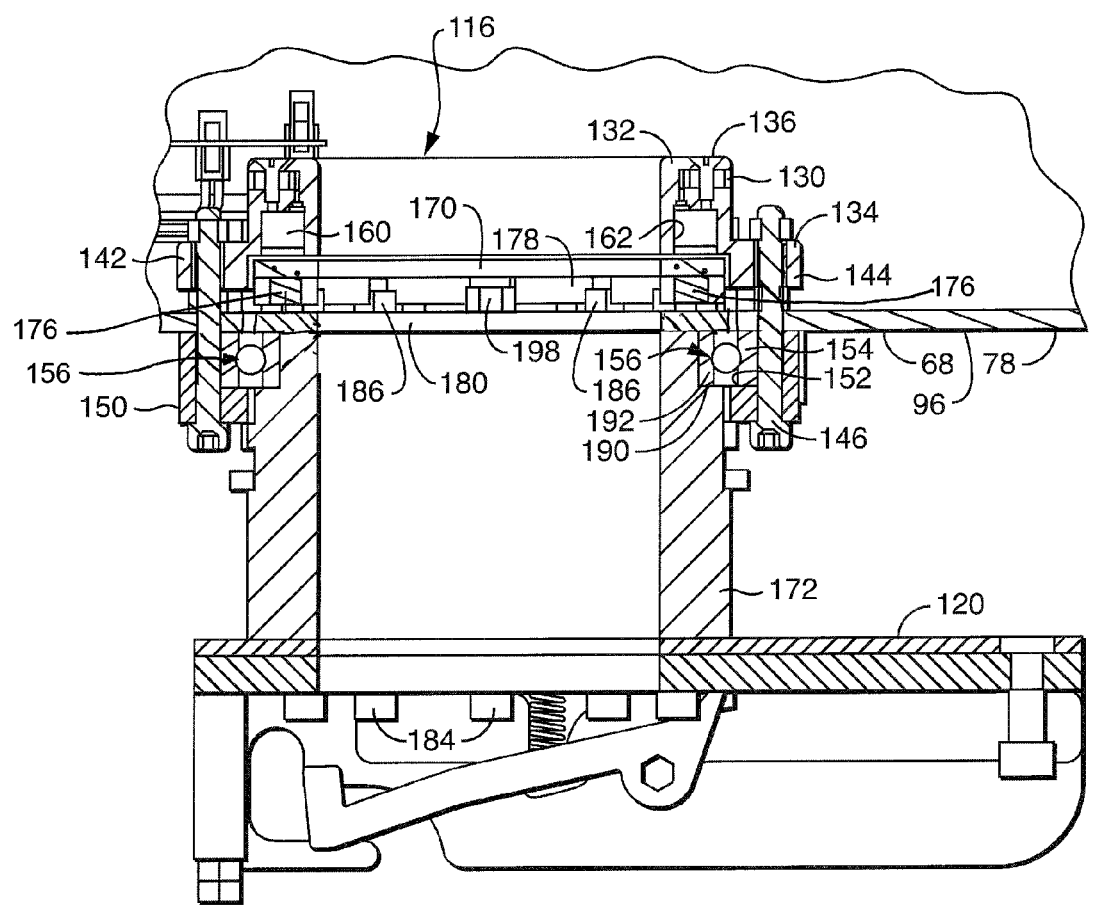
FIG. 6 is a fragmented sectional view of the distal end of the second arm showing the brake assembly, the rotor assembly and the saddle, forming a joint.
Figure 7:
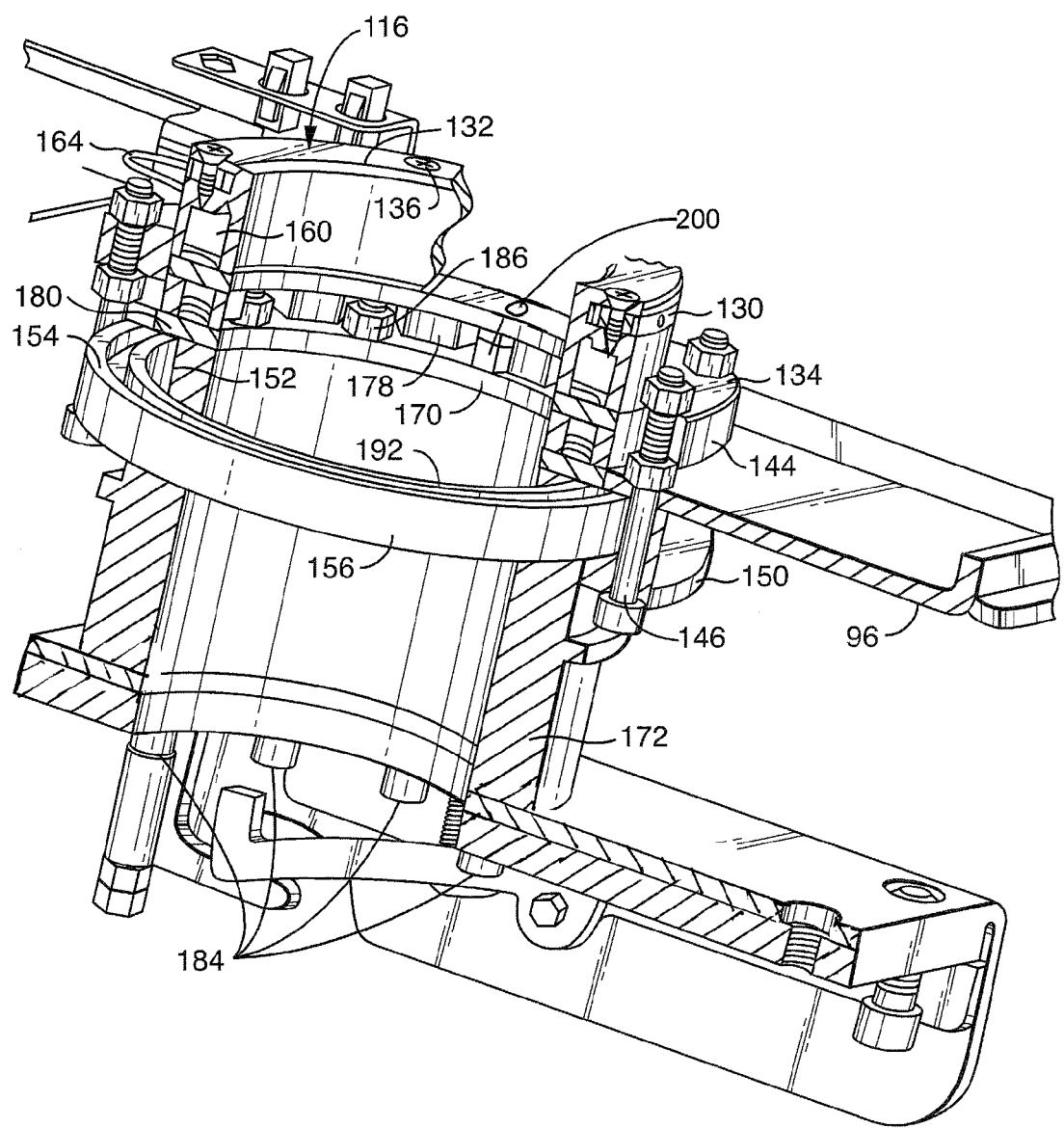
FIG. 7 is a partially sectional perspective view of the bearing or rotor end of the second arm.
Figure 10:
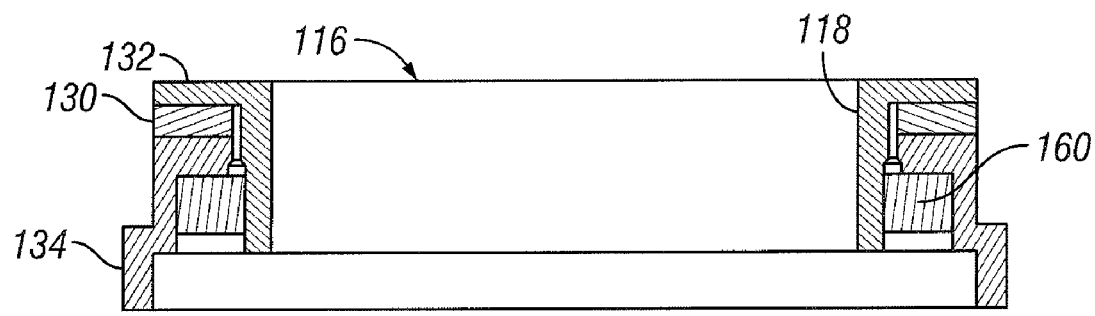
FIG. 10 is a cross-sectional view of the brake assembly shown in FIG. 9 taken along line 10-10 of FIG. 9.

Referring to FIGS. 6, 7 and 10, the coil 160 is received in a downwardly opening groove 162 formed by the inner and outer brake housings 132 and 134 when assembled. The coil 160 is energized by wires 164 (FIGS. 7 & 9) extending through openings 166 in the outer housing 134. The coil 160 may be embedded in epoxy filler (not shown).

Referring briefly again also to FIG. 5, the rotor assembly 112 comprises a rotor 170 and a rotor extension tube 172. The rotor 170 is continuously urged upwardly toward the bottom of the brake assembly 116 by coil springs 176 supported in a plastic spacer ring 178. The lower ends of the springs 176 sit on an annular bearing cap 180, which in turns rest on the upper edge of the extension tube 172. The extension tube 172 and the bearing cap 180 are secured together by long bolts 184 with hex nuts 186. An outer circumferential shelf 190 formed near the upper edge of the extension tube 172 supports the inner race 192 of the bearing assembly 156 and is captured between the bearing cap 180 and the tube (FIG. 6).

Figure 12:
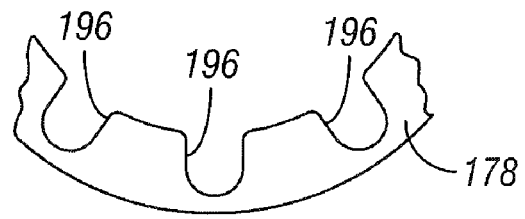
FIG. 12 is a fragmented plan view of the spacer.
Figure 9:
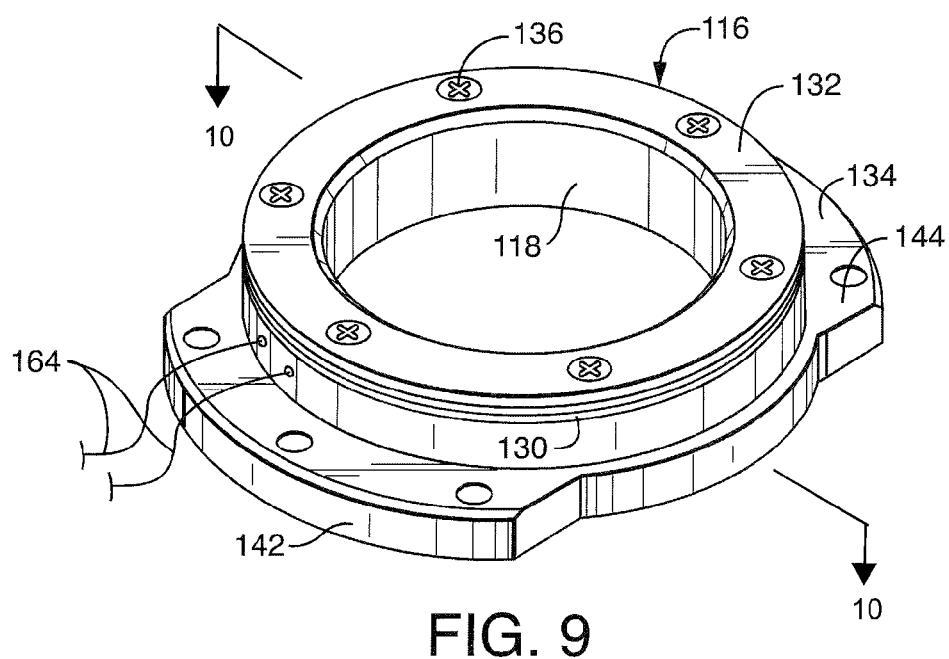
FIG. 9 is a perspective assembled view of the brake assembly.

The upper ends of the long bolts 184 extend up through openings 194 and 196 in the spacer 178 and the rotor 170 (FIGS. 5&12). The openings 194 in the spacer 178 are large enough to receive the standard hex nuts 186. The ends of the bolts 184 extend up through but do not engage the openings in the rotor 170.

When torque is applied to the coupler 120 and the attached rotor extension tube 172, torque is transferred to the "floating" rotor 170 by means of two custom nuts 198 (FIGS.

Figure 11:
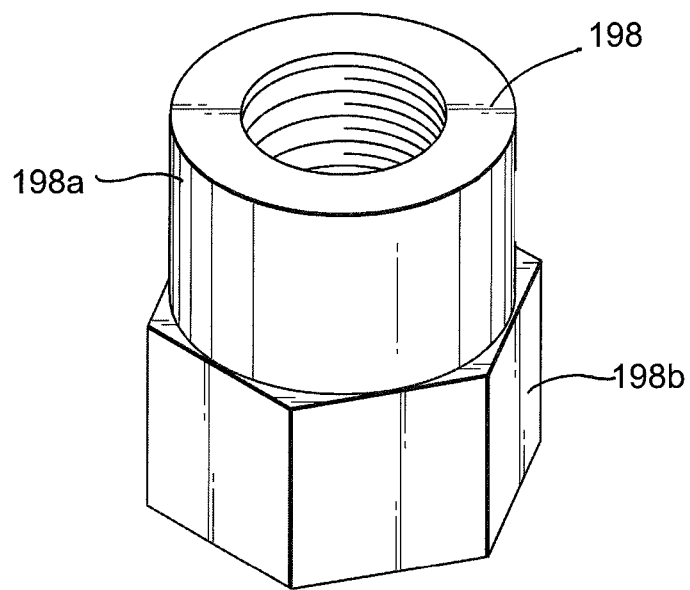
FIG. 11 is a perspective view of a custom hex nut used in the brake assembly.
Figure 13:
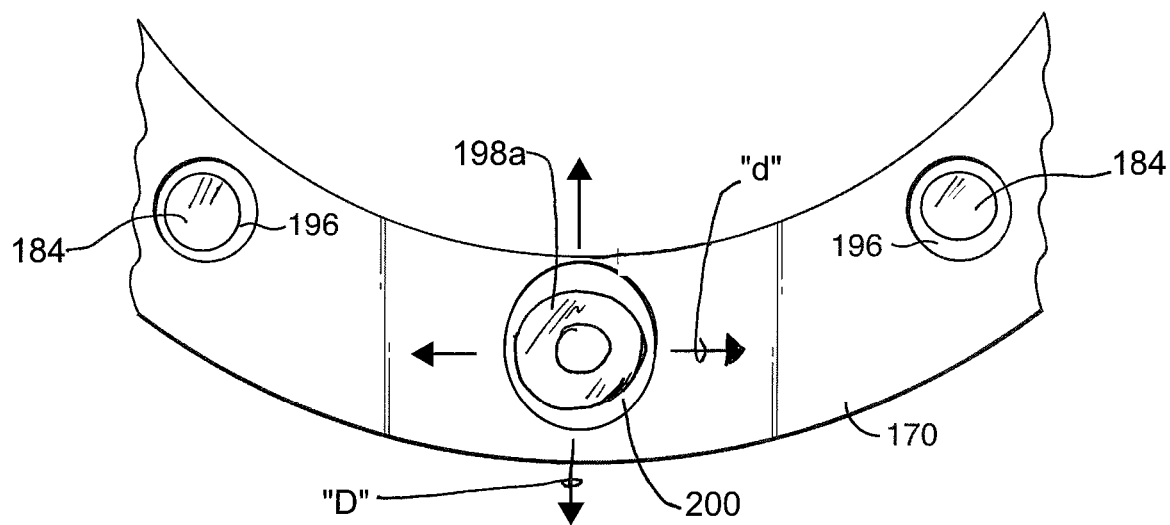
FIG. 13 is a fragmented plan view of the rotor showing the custom hex nut received in an oval opening in the rotor.

11 & 13) threadedly attached to the upper ends of two of the bolts 184. This arrangement is seen best in FIGS. 9 and 10. Two enlarged and oval shaped holes 200 are provided on opposite sides of the rotor 170. Two custom hex nuts 198 (FIG. 11) have an upper portion 198a and a lower portion 198b. The upper portion 198a is sized to be received in the ovoid holes 200 so that there is some hole "slop" or movement in the direction aligned with the long dimension "D" but so that relatively little movement is permitted in the perpendicular direction "d".

Figure 14:
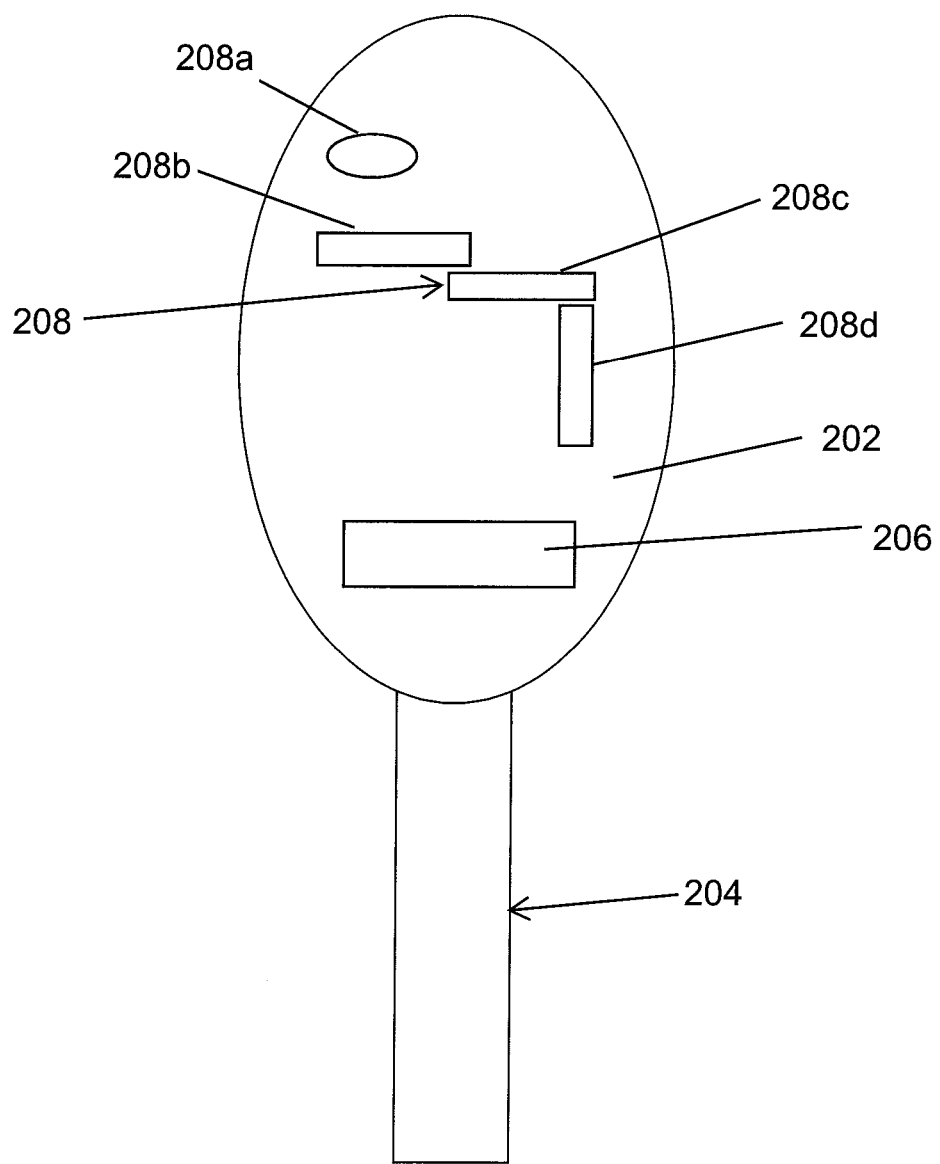
FIG. 14 is a diagrammatic illustration of a preferred handle with an integrated control panel.

The electrical wires 164 supplying the coil 160 are connected to an electrical circuit (not shown) that is controlled by a control panel 202, which may be formed in a handle 204 illustrated schematically in FIG. 14. The handle 204 may be conveniently placed on the column 24, as seen in FIGS. 1 and 2. As shown in FIG. 14, the control panel 202 is place at the top of a vertical bar shaped handle 204 and includes a pressure sensitive toggle switch 206 located for comfortable operation by the thumb or forefinger of the user while the fingers of the user's hand grip the handle 204.

Preferably, the toggle switch 206 has four positions. In the first or stop position, all the brake assemblies are engaged so that the position of the column 24 is maintained. In the second position, with the toggle switch 206 rocked to one side, preferably the left side as viewed in FIG. 14, the brake assemblies at the ceiling 12 (between the ceiling and the second arm) and the column 24 (allowing the column to rotate relative to the first arm) are released, so that the system 10 can be repositioned without bending the joint between the first and second arms 66 and 68. In the third position, with the toggle switch 206 rocked to the other side, preferably the right side as viewed in FIG. 14, the brake assemblies between the arms 66 and 68 and for the column 24 are released, so that the column and the first arm 66 can be repositioned without changing the position of the second arm 68 relative to the ceiling 12. In the fourth position, with the center of the switch 206 depressed, all the brake assemblies are released, allowing multi-directional movement at all joints of the system 10.

Referring still to FIG. 14, the control panel 202 preferably also includes appropriate indicator lights 208, supplied by LED's (light emitting diodes), for example. In a preferred arrangement, there are four indicator lights. A power light 208a remains lit when the system 10 is energized. This also serves to confirm that the system 20 is connected to power.

A first horizontal bar-shaped light 208b indicates by lighting up or glowing when the brake assembly between the second arm 68 and the ceiling 12 is released. A second horizontal bar-shaped light 208c indicates when the brake assembly between the first and second arms 66 and 68 is released. A third vertical bar-shaped light 208d indicates when the brake assembly for the column 24 is released. Now it will be understood that the configuration and arrangement of the three bar-shaped lights 208b-d generally mimics the shape and arrangement of the first and second arms 66 and 68 and column 24 of the system 10, visually communicating to the user function of the switch 206.

Now it will also be seen that in all active switch positions the switch 206 releases the third brake assembly, that is, the brake assembly that controls rotation of the column 24. This is desirable because it will virtually always be necessary to rotate the column 24 at least slightly regardless of how the other components are being repositioned.

When the coil 160 is not energized, the permanent magnet 130 exerts a strong direct force on the rotor 170 to resist rotation so that the column will not be inadvertently moved. The magnet and rotor should be selected to provide resistance up to a predetermined torque, selected to prevent inadvertent movement but to allow the column 24 to move in response to a force greater than the resistance to overcome the power of the magnet. This will reduce the likelihood of serious damage to the system 10 if the column 24 is accidentally hit by a strong force, such as a motorized x-ray machine. When the coil 160 is energized, the coil neutralizes the force of the magnet 130 and allows the rotor 42 assembly to rotate freely.

Now it will be apparent that the brake assemblies utilized in this embodiment are electrically released, that is, the brake member (the permanent magnet) continuously engages the rotor until the coil is energized, which neutralizes the braking action of the permanent magnet. It will also now be appreciated that other brake designs could be substituted. For example, while the brake member in the preferred embodiment comprises a permanent magnet, there may be applications where only an electric magnet is required. For example, an electric brake without a permanent magnet could be used in applications where the brake is engaged when energized instead of released.

Various modifications in the configuration of the brake member are contemplated as well. For example, the brake member in this embodiment is ring-shaped, similar to the rotor, and the two surfaces are structurally arranged much like a clutch plate and a flywheel, although the engagement mechanism is magnetic attraction instead of mechanical pressure to create a frictional engagement. (Of course, in the present invention, engagement of the permanent magnet with the rotor prevents rotation instead of driving it.) Alternative electromagnetic brake configurations include electrically energized magnetic brake shoes, as in a drum brake, or calipers, as in a disc brake. Most preferably, however, the brake system herein relies on magnetic attraction between the brake and the rotor, rather than a purely mechanical engagement.

Now it will be appreciated that the preferred brake assembly employed in this invention not only permits multiple service conduits to pass through its center bore but also combines a strong brake force with a simple design having relatively few parts. This provides a service column that is stable for attaching and removing medical equipment, and yet requires less maintenance than more complex systems. In addition, the only power required by the brake assembly is electricity, avoiding the problems associated with pneumatic braking systems, such as the requirement for separate, dedicated air compressors.

The system 10 of the present invention also provides an improved coupling design, depicted in FIGS. 15-18. As previously mentioned, first, second and third couplers 50, 120 and 92 are attached to the bottoms of the rotor assemblies 42, 82, and 112. The coupler 92 is simply a plate as has been previously explained. The first and second couplers 50 and 120 are identical and therefore only the second coupler will be described. Similarly, since the proximal ends 70 and 76 of the first and second arms 66 and 68 are identically formed, only the proximal or coupling end of the first arm will be described.

As shown in FIG. 15, the two inwardly projecting pins 210 and 212 are provided on the inside of the side walls of the arm housing 80. These may be integrally formed in the housing or incorporated in a rib or brace 214 which is then fixed to the inside of the housing.

The preferred coupler 120 is a saddle shaped structure having a top wall 216 and two depending side walls 218 and 220 (FIG. 5). Each side wall 218 and 220 has formed in it a J-shaped slot 224 and 226, each having a horizontal leg and a vertical leg. Also provided on the inside of the side walls 218 and 220 are latches pivotally mounted on pivot pins for movement between an open position, in which the J-slot is open, and a closed position in which the J-slot is blocked. Preferably, each latch 230 has a foot, such as the foot 234. The latch 230 is biased in the downward or closed position, shown in FIG. 14, by a coil spring 236.

The operation of this "slide and lock" coupling is illustrated in FIGS. 17 and 18. With the second arm 68 already installed and its coupler/saddle 120 supported from above, the first arm 66 is lifted and tilted as shown in FIG. 17. This allows the saddle 120 to be guided inside the access opening 240 (FIG. 4) in the arm housing 80 so that the pins 210 and 212 move into the horizontal legs of the J-slots 224 and 226. Next, the arm 66 is brought back to a level position and moved forward so that the pin 212 moves back and up into the vertical leg of the J-slot, as seen in FIG. 18. As the pin 212 moves through the slot, it pushes the latch 230 upwardly. Once the pin 212 reaches the vertical leg of the J-slot, the foot 234 of the latch 230 snaps back into its resting position and blocks the escape of the pin 212. In this way, the coupling of the arm 68 to the saddle 120 is accomplished by a single, sliding movement of the arm.

The couplers utilized in this invention also comprise a multi-dimensional leveling assembly also seen in FIGS. 16-18, designated generally by the reference numeral 242. The leveling assembly 242, in its preferred form, comprises two pairs of leveling bolts, including one upwardly extending pair 244 that engages the top of the housing 80 and one downwardly extending pair 246 that engages the bottom of the housing. The pitch and roll of the arm 68 can be adjusted by independently adjusting the each of the four leveling bolts.

Figure 19:
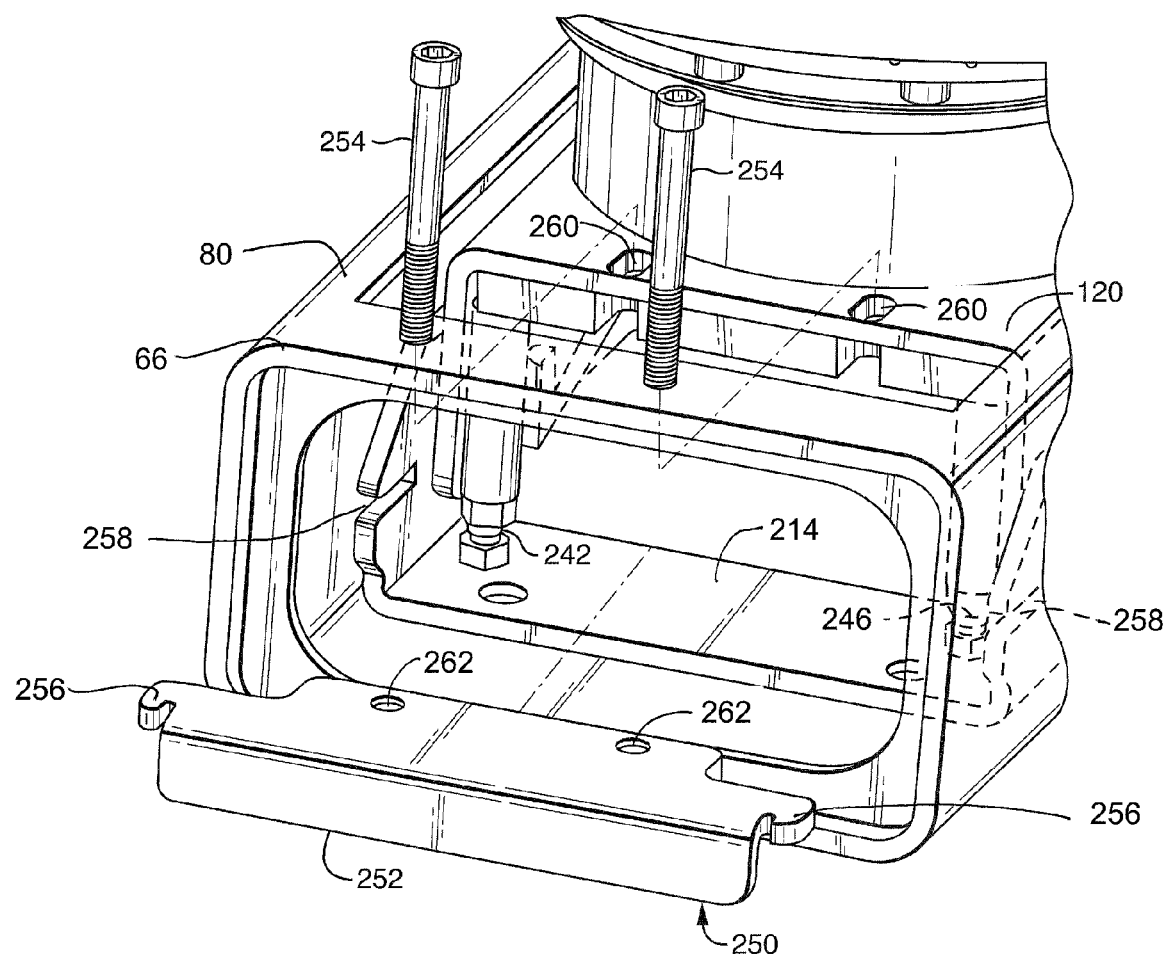
FIGS. 19 and 20 illustrate placement of the locking bracket after the entire system has been installed and leveled.
Figure 20:
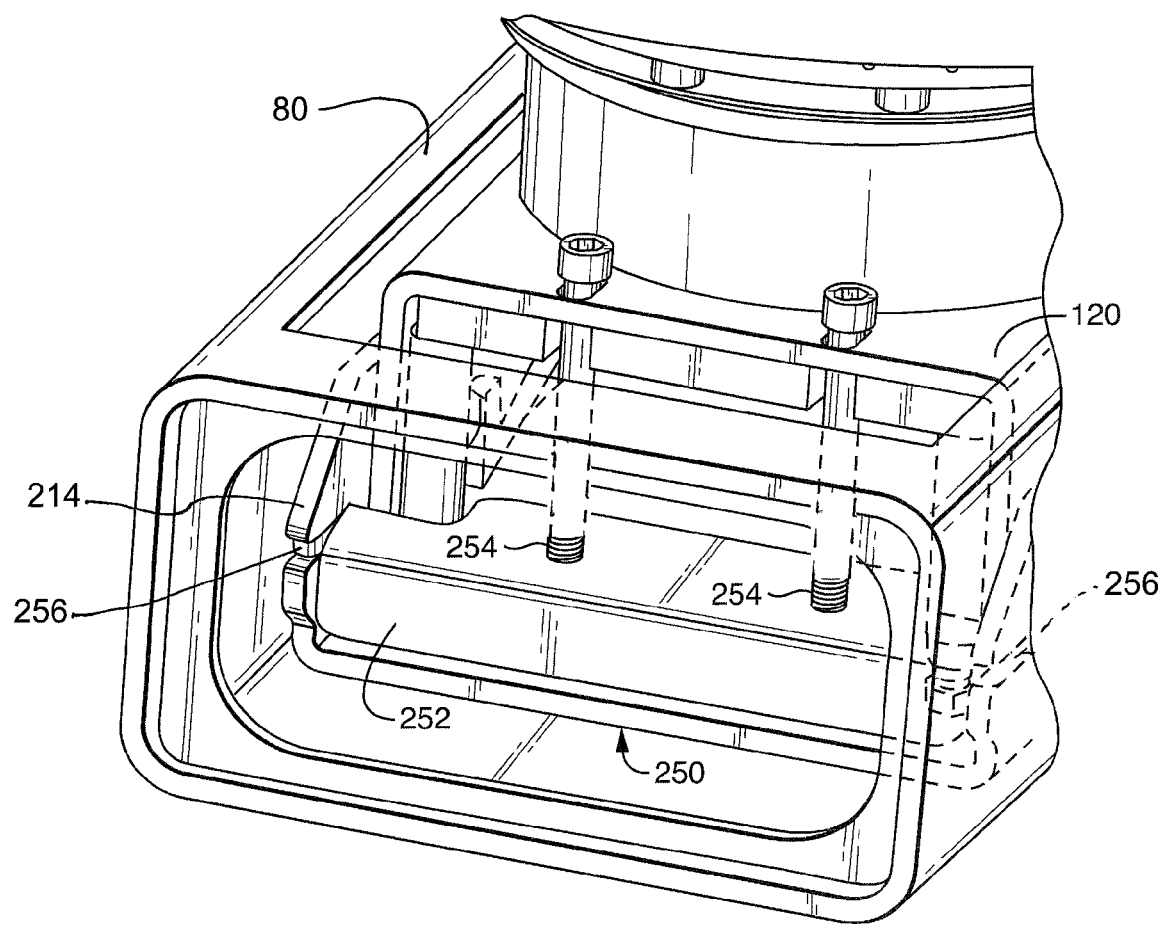

Once the joint been assembled and the arm have been leveled, the position of the arm can be locked into place with a locking assembly 250, illustrated in FIGS. 19 and 20. The locking assembly 250 comprises a locking bracket 252 and a pair of locking bolts 254. The bracket 252 is adapted to engage the arm in some manner and so may be provided with a pair of laterally extending ears 256 that are engageable with notches or slots 258 formed on the sides of the arm 66. The notches are conveniently formed as part of the brace 214, as is also shown in FIGS. 4, 5 and 15. As seen in FIGS. 19 and 20, the bolts 254 are receivable in the holes 260 in the top of the saddle 120.

First, the locking bracket 252 is placed between the downwardly extending leveling bolts 246 (FIG. 19) so that the ears 256 are positioned in the slots 258. Then, the locking bolts 254 are inserted through the holes 260 in the top of the saddle 120 and threaded down through the aligned holes 262 in the locking bracket (FIG. 20). As the locking bolts 254 are threaded in the holes 262, the bracket 252 is pulled upwardly toward the top of the saddle 120. At the same time, because the ears 256 are extending through the slots 258, the brace 214 and attached arm housing 80 are likewise pulled upwardly until a tight engagement between the saddle 120 and arm housing is achieved.

In the embodiment shown, the locking engagement between the arm housing and the saddle is performed by the notches fixed inside the arm and the ears on the locking bracket. Those skilled in the art will recognize that various other structures and shapes may be employed for this purpose.

Having described the various components and features of the system 10, a preferred installation procedure will be summarized. First, the mounting assembly 20 is secured to a suitable structure in the ceiling 12. The locking bolts 254 are removed, and the leveling bolts 244 and 246 are retracted. Next, the second arm 68 is lifted into place and the latch pins 212 are engaged with the latch 230 on the saddle/coupler 120, as previously described. Then the second arm 68 is leveled using the leveling assembly 240, and the locking assembly.

Figure 21:
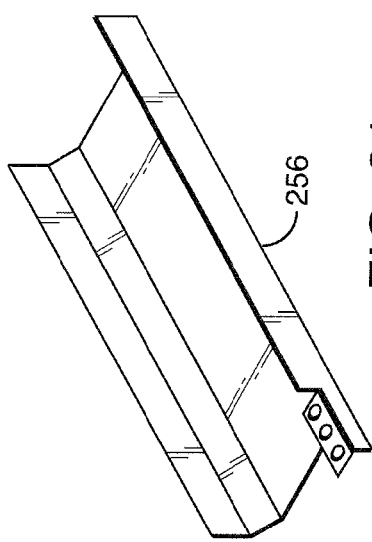
FIG. 21 is a perspective view of the conduit tray for use inside the arm housings.

Once the second arm 68 is connected, the first arm 66 is engaged with the second coupler 120, and the leveling and locking assemblies 242 and 250 are engaged as before. Now the third coupler, the coupling plate 92, is accessible. At this point the conduits 34 are fed through the arm assembly 22. Use of a conduit tray 266, such as that show in FIG. 21, inside each housing 80 and 110 will facilitate the conduit placement. The supply ends of the conduits 34 are connected to their respective outlets 30 inside the column 24, and then the column may be mounted to the coupling plate 92. Some additional leveling may be necessary after attachment of the column 24.

Figure 22:
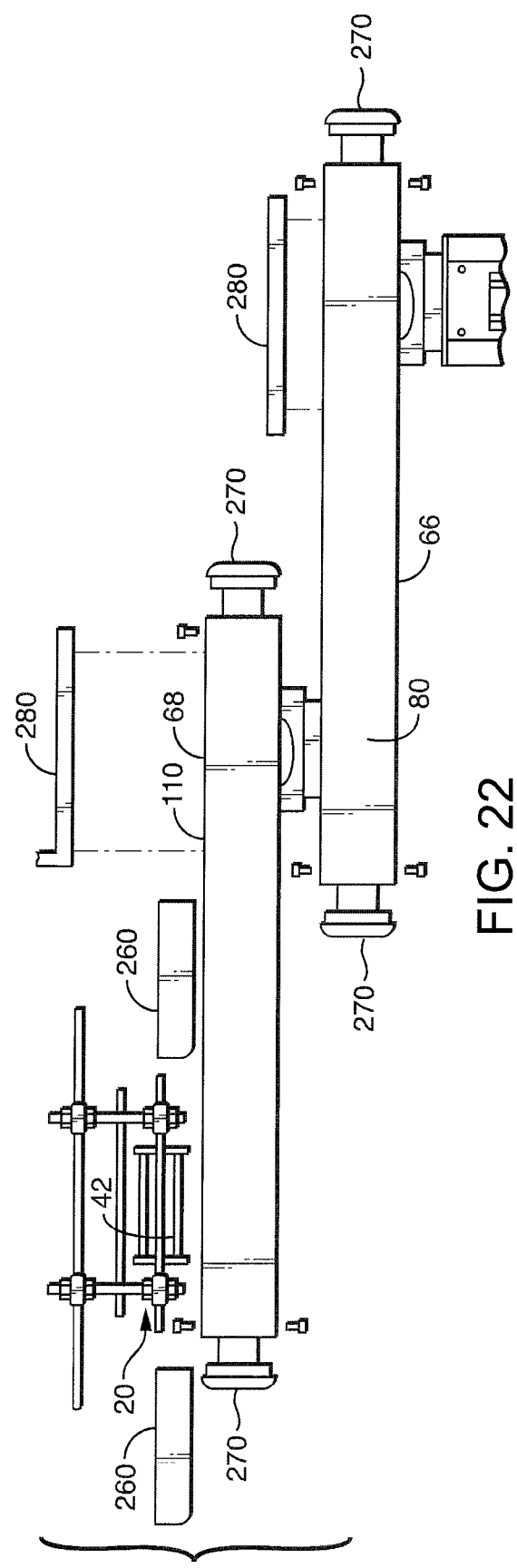
FIG. 22 is a partially exploded side view illustrating the placement of the mounting assembly shroud, the leveling screw caps, the housing end caps, and the housing cover plates upon completion of the installation.

Once the locking assemblies 250 all are in place, the installation is completed as shown in FIG. 22 by attaching the shroud 268 around the first rotor assembly 42 on the mounting assembly 20. End caps 270 are placed over the open ends of the arm housings 80 and 96. Cover plates 280 are attached over the access openings 240 and 248 (FIGS. 4&5) in the housings.

Now it will be appreciated that the four main components of the system 10—the mounting assembly, the first arm, the second arm, and the column—can be preassembled as modular units and shipped in four separate packages, which are smaller and lighter to ship and to handle at the site. The smaller, modular components can be easily installed by only two workers. This assembly is made safer and simpler by the "slide and lock" couplings at each joint. The leveling assemblies permit easy access and adjustment for routine maintenance throughout the life of the system, as well as during installation. Finally, the brake assemblies are advantageous because they provide improved strength and stability when the column is at rest, while allowing the column to yield in response to an accidental impact that would otherwise be damaging. The electrically releasable magnetic brakes are incorporated into other annular components of the joints with large central openings that allow all the conduits to pass through eliminating the need for additional space around the joints.

Changes can be made in the combination and arrangement of the various parts and steps described herein without departing from the spirit and scope of the invention.

What is claimed is:

1. A service system for use in a structure having a support surface, the system comprising:
    a mounting assembly comprising:
        a mounting member connectable to the support surface;
        a first rotor mounted for rotation relative to the mounting member and having a central bore therethrough;
        a first electromagnetic brake assembly adapted to control rotation of the first rotor, the first brake assembly comprising a first permanent magnet having a central bore therethrough and being magnetically engageable with the first rotor and a first coil having a central bore therethrough for selectively controlling the magnetic engagement between the first permanent magnet and the first rotor, wherein the first permanent magnet and the first coil are positioned coaxially with the first rotor so that the central bores are aligned, and so that when the first coil is not energized attraction of the first permanent magnet for the first rotor causes the first rotor to resist rotation and when the first coil is energized attraction of the first permanent magnet for the first rotor is neutralized releasing the first rotor to rotate freely; and a first coupler supported on the first rotor for rotation therewith;

an arm assembly having a distal end and a proximal end, the proximal end engageable with the first coupler, the arm assembly further comprising:
 a second rotor mounted on the distal end of the arm assembly for rotation relative thereto, the second rotor having a central bore therethrough;
 a second electromagnetic brake assembly adapted to control rotation of the second rotor, the second brake assembly comprising a second permanent magnet having a central bore therethrough and being magnetically engageable with the second rotor and a second coil having a central bore therethrough for selectively controlling the magnetic engagement between the brake member and the rotor, wherein the second permanent magnet and the second coil are positioned coaxially with the second rotor so that the central bores are aligned, and so that when the second coil is not energized attraction of the second permanent magnet for the second rotor causes the second rotor to resist rotation and when the second coil is energized attraction of the second permanent magnet for the second rotor is neutralized releasing the second rotor to rotate freely; and
 a second coupler supported on the second rotor for rotation therewith;

a service unit having a proximal end and a distal end, the proximal end engageable with the second coupler for rotation therewith, and including at least one service outlet supported thereon;

at least one conduit for supplying a service to the at least one service outlet on the service unit, the conduit extending from beyond the support surface through the central bores of the first and second rotor assemblies, the first and second permanent magnets, and the first and second coils, and into the service unit to connect to the outlet; and a control assembly for operating the brake assemblies, the control assembly comprising:
 a circuit for connecting the brake assemblies to a power source; and
 a switch in the circuit for energizing the brake assemblies.

2. The services system of claim 1 wherein the arm assembly comprises first and second arms, each arm having proximal and distal ends, the proximal end of the second arm being the proximal end of the arm assembly, the distal end of the first arm being the distal end of the arm assembly, the arm assembly further comprising:
 a third rotor mounted on the distal end of the second arm for rotation relative thereto, the third rotor having a central bore therethrough;
 a third electromagnetic brake assembly adapted to control rotation of the third rotor, the third brake assembly comprising a third permanent magnet magnetically engageable with the second rotor and a third coil for selectively controlling the magnetic engagement between the third permanent magnet and the third rotor, each of the third coil and the third permanent brake member having a central bore therethrough, wherein the third permanent magnet and the third coil are positioned coaxially with the third rotor so that the central bores are aligned, and so that when the third coil is not energized attraction of the third permanent magnet for the third rotor causes the third rotor to resist rotation and when the third coil is energized attraction of the third permanent magnet for the third rotor is neutralized releasing the third rotor to rotate freely; and
 a third coupler supported on the third rotor for rotation therewith.

3. The service system of claim 2 wherein the control assembly comprises a switch having a plurality of switch positions including a stop position, in which all the rotors in the system are braked, and at least one release position, in which the second brake assembly is released.

4. The service system of claim 3 wherein the at least one release position comprises first, second and third release positions, wherein the first release position releases the first and second brake assemblies, wherein the second release position releases the second and third brake assemblies, and wherein the third release position releases the first, second and third brake assemblies.

5. The service system of claim 4 wherein all the rotors and all the permanent magnets are ring-shaped.

6. The service system of claim 1 wherein the switch of the control assembly has a plurality of switch positions including a stop position, in which all the rotors in the system are braked, and at least one release position, in which the second brake assembly is released.

7. The service system of claim 6 wherein the at least one release position comprises first and second release positions, wherein the first release position releases the second brake assembly, and wherein the second release position releases the first and second brake assemblies.

8. The service system of claim 1 wherein the switch is positioned on the service unit.

9. The service system of claim 8 further comprising a handle for gripping the service unit to reposition the system, and wherein the switch is incorporated in the handle.

10. The service system of claim 1 wherein the first and second permanent magnets each comprises a plurality of arc-shaped sections that together form a ring, each section having a polarity.

11. The service system of claim 10 wherein each section of the each of the permanent magnets is provided with a polarity indicator.

12. The service system of claim 11 wherein each polarity indicator is visually perceptible.

13. The service unit of claim 1 wherein the at least one service outlet comprises a plurality of service outlets and wherein the at least one conduit comprise a plurality of conduits.

14. The services system of claim 1 wherein the service unit is a vertical column, and wherein the arm assembly is generally horizontal.

15. The services system of claim 14 wherein the mounting member is configured to attached to a ceiling as the support structure.

* * * * *